United States Patent [19]
Artzberger

[11] 3,997,932
[45] Dec. 21, 1976

[54] DOCKBOARD HAVING IMPROVED LIP LIFTING MECHANISM

[75] Inventor: Thomas Artzberger, Menomonee Falls, Wis.

[73] Assignee: Kelley Company, Inc., Milwaukee, Wis.

[22] Filed: Dec. 13, 1974

[21] Appl. No.: 532,501

[52] U.S. Cl. .................................................. 14/71.3
[51] Int. Cl.² ........................................ B65G 11/00
[58] Field of Search .......................................... 14/71

[56] References Cited
UNITED STATES PATENTS

| | | | |
|---|---|---|---|
| 3,323,158 | 6/1967 | Loomis | 14/71 M |
| 3,411,168 | 11/1968 | Hecker | 14/71 M |
| 3,475,778 | 11/1969 | Merrick | 14/71 M |
| 3,606,627 | 9/1971 | Potter | 14/71 M |
| 3,646,627 | 3/1972 | Potter | 14/71 M |
| 3,699,601 | 10/1972 | Hecker | 14/71 M |

Primary Examiner—Nile C. Byers, Jr.
Attorney, Agent, or Firm—Andrus, Sceales, Starke & Sawall

[57] ABSTRACT

A dockboard having an improved lip lifting mechanism. The dockboard includes a ramp hinged at its rear edge to a loading dock, and the ramp is adapted to be moved from a generally horizontal cross traffic position to an upwardly inclined position by a counterbalancing spring assembly. A lip is hinged to the front edge of the ramp and can be pivoted from a pendant, downwardly hanging, position to a partially extended position just short of its fully extended position by a lip lifting mechanism which is actuated as a consequence of the ramp moving downwardly from the inclined position toward the cross traffic position.

11 Claims, 8 Drawing Figures

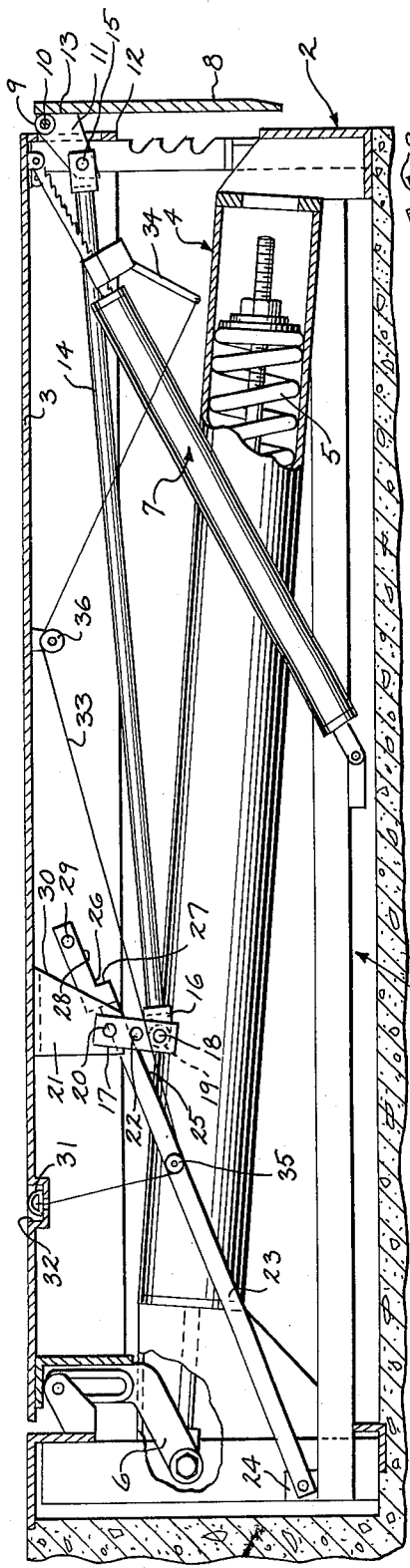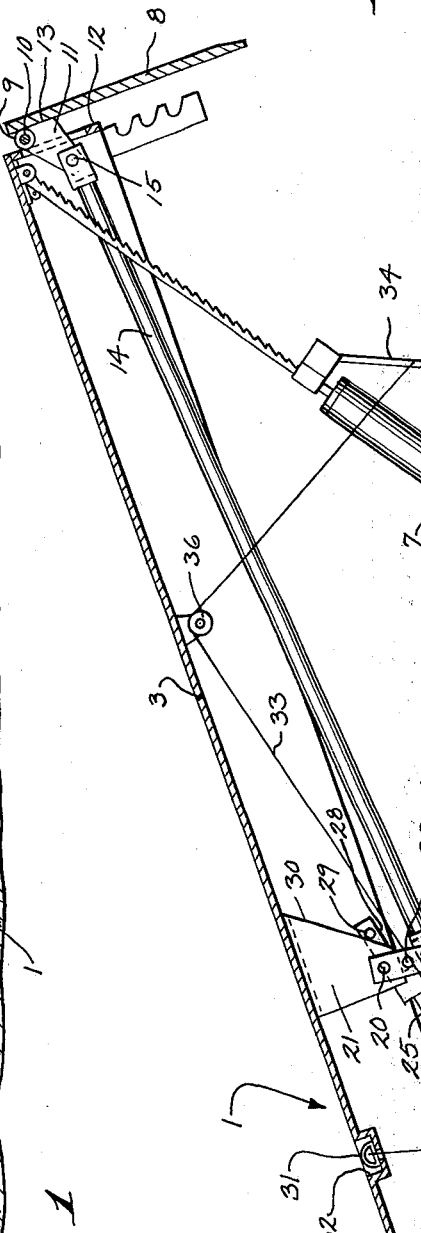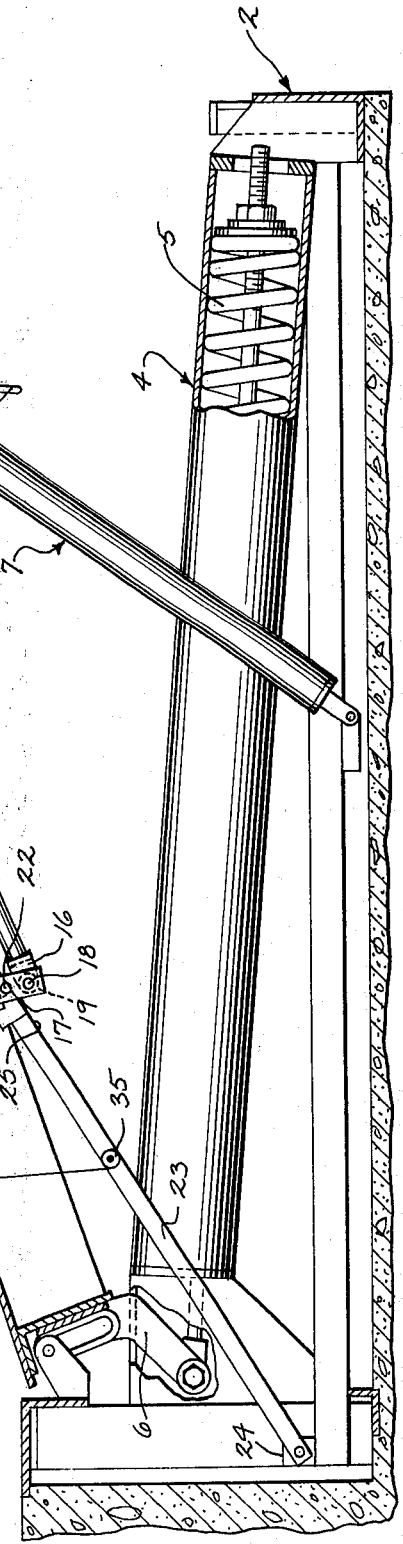

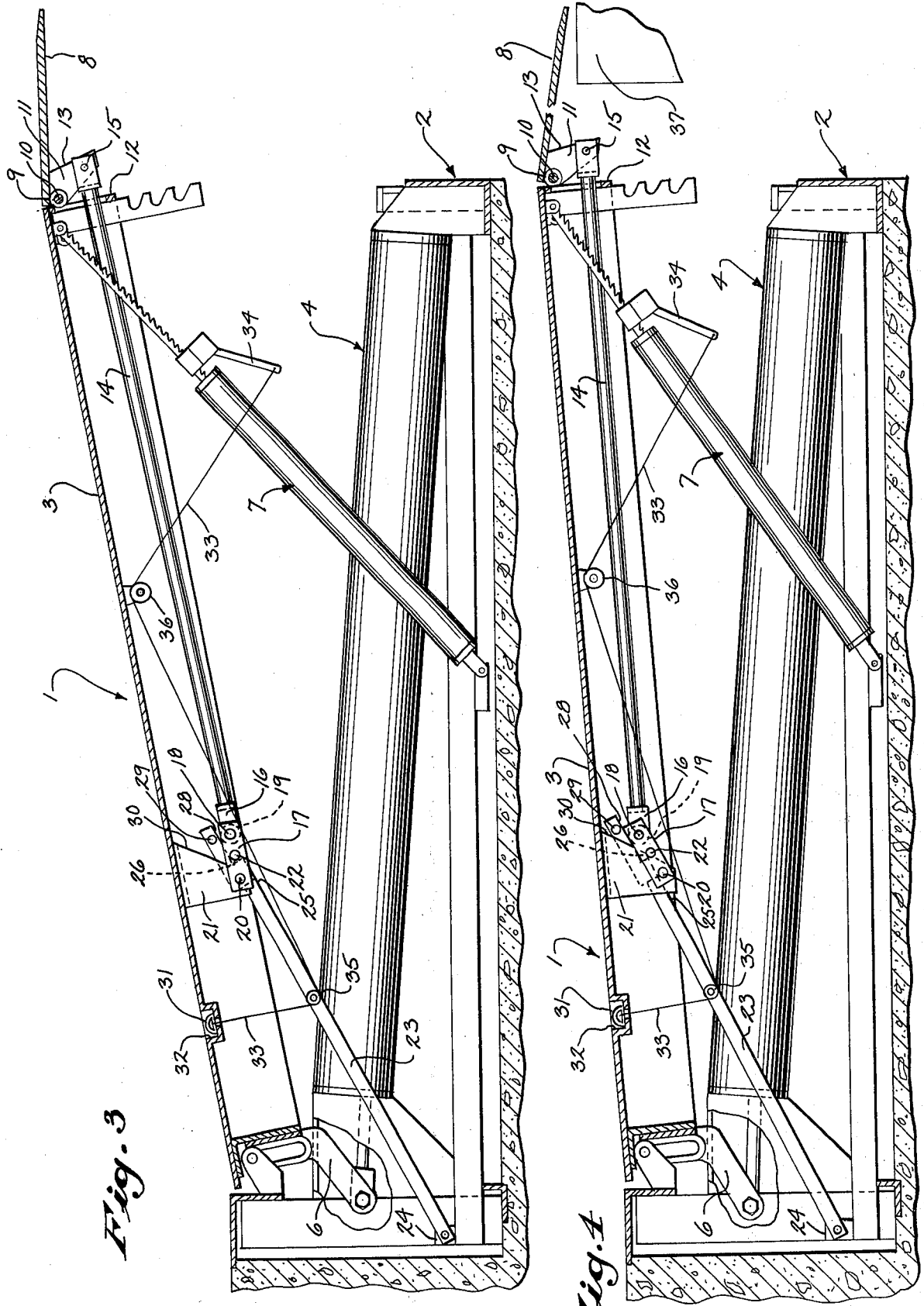

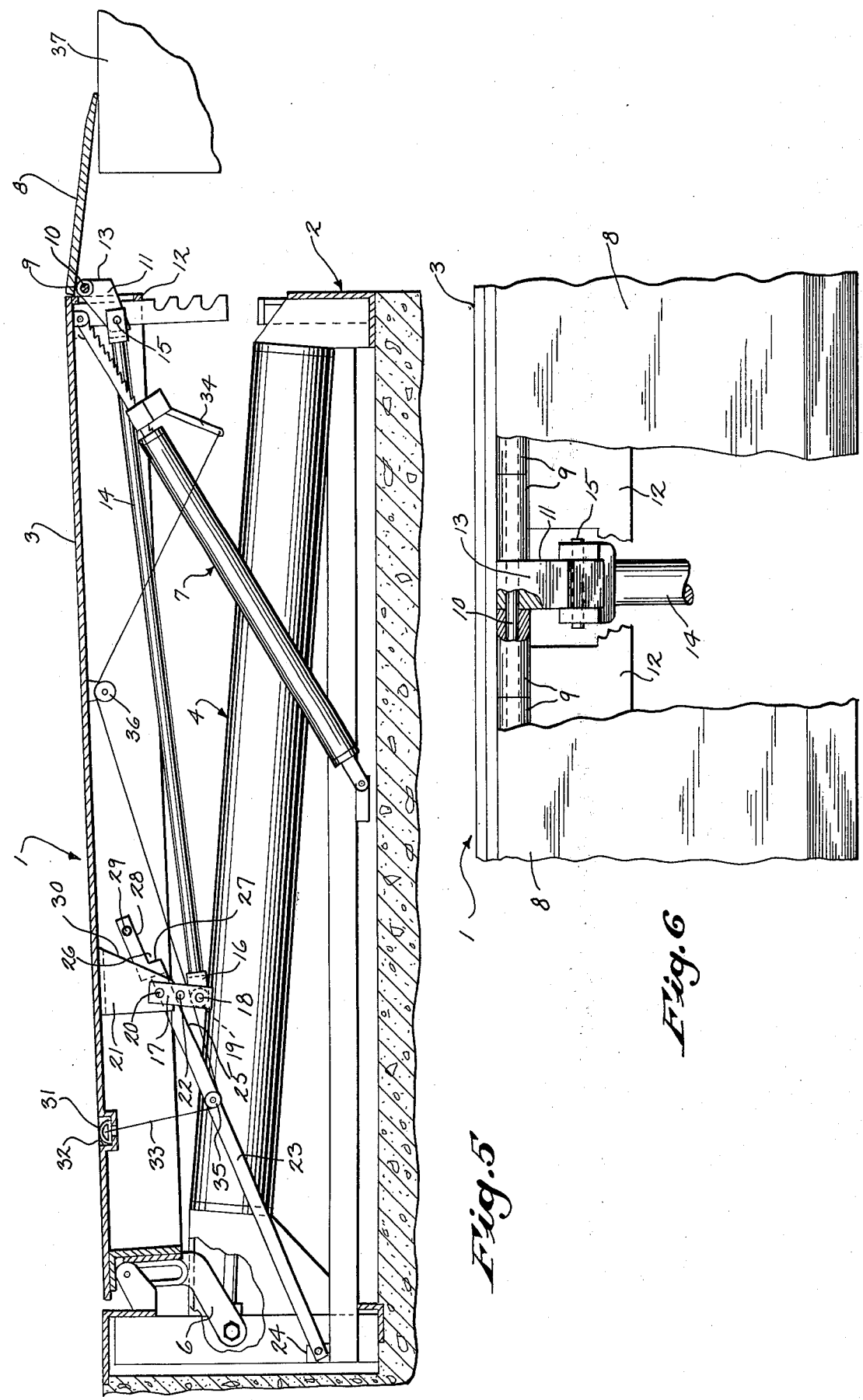

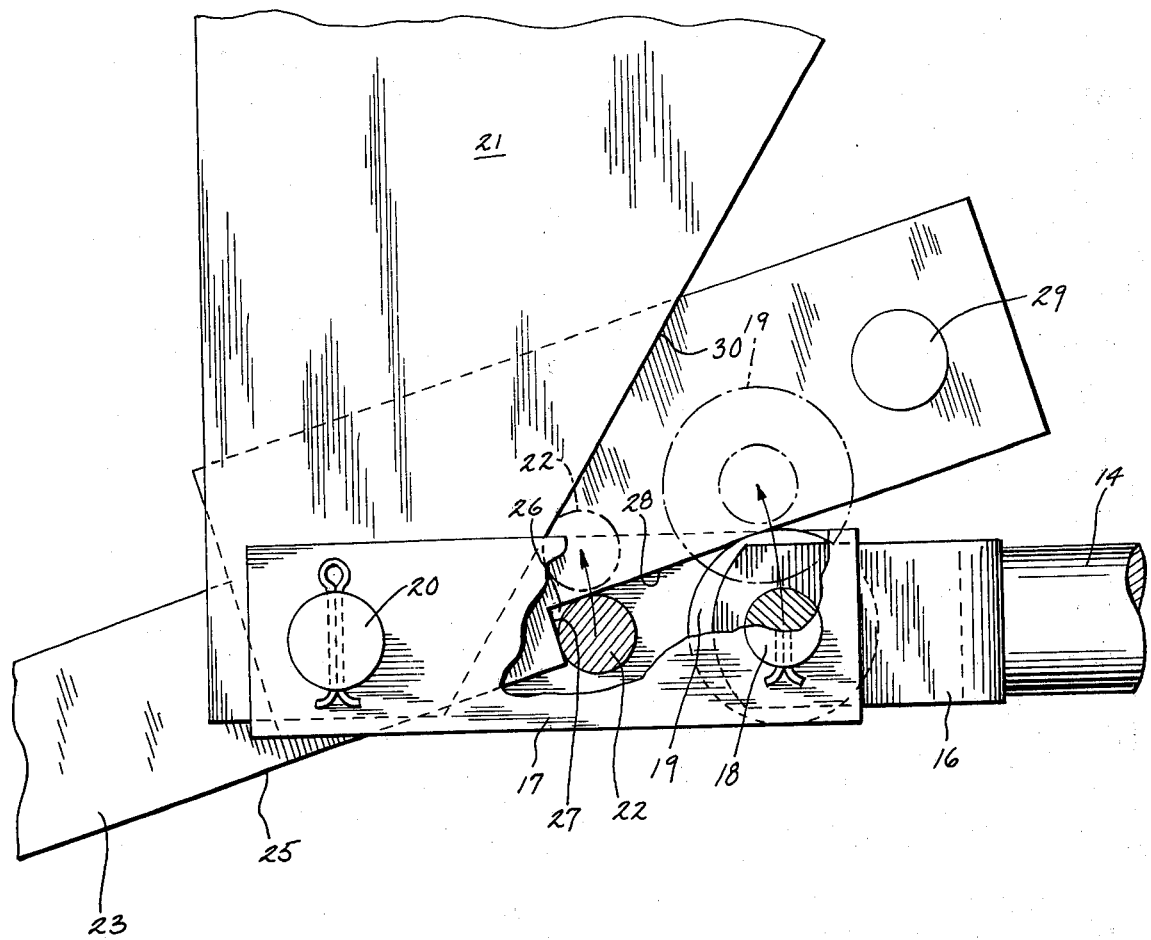
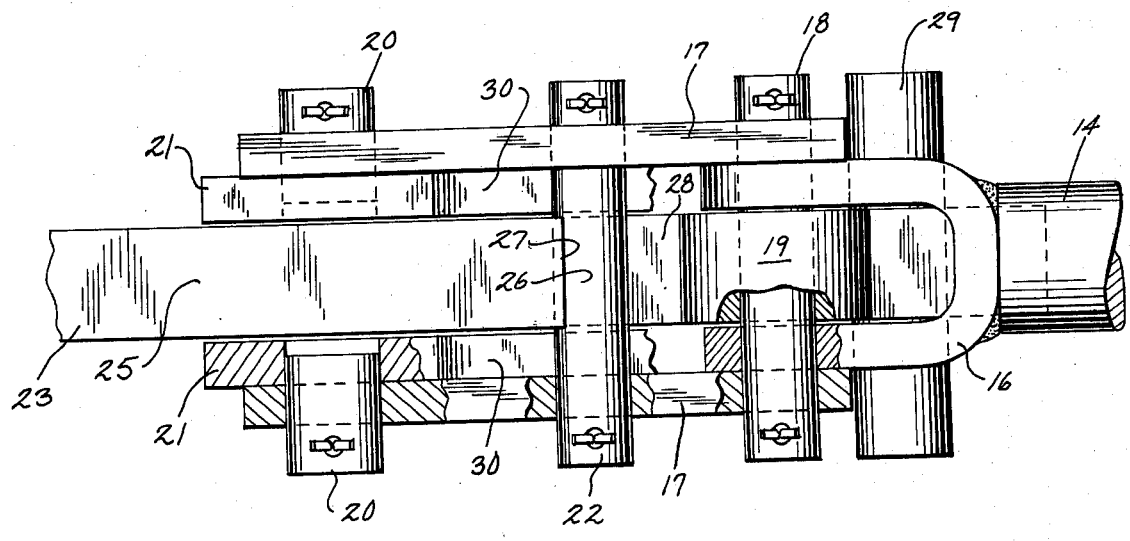

DOCKBOARD HAVING IMPROVED LIP LIFTING MECHANISM

BACKGROUND OF THE INVENTION

An adjustable dockboard, as shown in U.S. Pat. No. 3,117,332, includes a ramp having its rear end hinged to a dock. The ramp is biased upwardly to an inclined position by a spring assembly, and a manually releasable holddown device holds the ramp against elevation. Hinged to the front edge of the ramp is an extension lip which is adapted to swing from a pendant position, in which the lip hangs downwardly from the front edge of the ramp, to an elevated position in which the lip forms an extension to the ramp. The lip, when in the extended position, is adapted to engage the bed of a truck or carrier and bridge the gap between the ramp and the truck to enable material handling equipment to move between the dock and the truck.

In the dockboard, as disclosed in U.S. Pat. No. 3,117,332, the extension lip is automatically raised to its elevated position by a lip lifting and latching mechanism which is actuated by the upward movement of the ramp when the holddown device is released. With the lip extended and the ramp in the upwardly inclined position, the ramp is walked down by the operator until the lip engages the bed of the truck. The engagement of the lip with the bed of the truck releases the weight from the lip latching mechanism, thereby releasing the latching mechanism, so that when the truck pulls away from the dock the lip will automatically return to its pendant position.

As disclosed in U.S. Pat. No. 3,117,332, the lip lifting mechanism can take the form of a flexible cable attached between the supporting frame and a crank arm pivoted to the ramp and engageable with the underside of the lip. When the ramp is elevated through use of the counterbalancing spring assembly, the cable becomes taut to pivot the crank arm and thereby pivot the lip toward the extended position.

As the lip has substantial weight, a lip assist or lip counterbalancing mechanism, such as that disclosed in U.S. Pat. No. 3,203,002, can be incorporated to aid in swinging the lip toward its extended position.

SUMMARY OF THE INVENTION

The invention relates to a dockboard having an improved lip lifting mechanism. The dockboard includes a ramp hinged at its rear edge to the loading dock and the ramp is adapted to be pivoted upwardly from a generally horizontal, cross traffic position to an upwardly inclined position by a counterbalancing spring assembly.

A lip is hinged to the front edge of the ramp and can be pivoted from a downwardly hanging pendant position to a partially extended position, just short of its fully extended position by a lip lifting mechanism which is actuated as a consequence of the ramp being walked down from the inclined position toward the cross traffic position.

More specifically, the lip lifting mechanism includes a lip lifting lug pivoted to the ramp and having a surface adapted to engage the undersurface of the lip. The lug is connected through a rod to one end of the link that is pivoted to the undersurface of the ramp.

When the ramp is in the horizontal, cross traffic position, the link and rod are in the under toggle position, and as the ramp is elevated, a locking bar, connected to the supporting structure engages the link to thereby connect the link to the supporting structure.

When the ramp is walked down by the operator from the inclined position toward the cross traffic position, the relative movement of the ramp with respect to the locking bar causes the link to pivot and moves the rod forwardly to thereby lift the lip toward its partially elevated position. When the ramp has been walked down to a predetermined inclination, the link and rod move into an over-center relationship and the locking bar is disengaged from the link. The over-center relationship between the link and the rod is maintained by the weight of the lip acting rearwardly through the rod.

When the ramp is walked down to a position where the lip engages the bed of a truck, the engagement of the lip with the bed of the truck will move the lip to the fully extended position, thereby releasing the weight from the rod and causing the toggle to break, with the link and rod returning to an undercenter position by gravity. With the toggle broken, the lip will automatically fall to its pendant position when the truck pulls away from the dock.

Since the elevation of the lip is not dependent upon the upward velocity of the ramp, a lesser spring force can be used to move the ramp to the upwardly inclined position. This results in a smoother upward movement of the ramp, and further provides a slower and more uniform movement of the lip from the pendant to the extended position.

As the lip is not extended until the ramp is walked down by the operator, the operational capacity of the dockboard is increased with respect to high bed trucks, in which the truck bed may be a substantial distance above dock level. With use of a conventional dockboard, in which the lip is swung toward its extended position on elevation of the ramp, the tip of the upwardly swinging lip could, in some cases, contact the bed of the truck, if the truck bed was a substantial distance above dock level and thereby prevent the lip from being latched in the extended position. This problem is minimized with the use of the dockboard of the invention in that the lip is swung outwardly on downward movement of the ramp, so that proper lip operation can be accomplished with higher bed trucks.

Other objects and advantages will appear in the course of the following description.

DESCRIPTION OF THE DRAWINGS

The drawings illustrate the best mode presently contemplated of carrying out the invention.

In the drawings:

FIG. 1 is a side elevation of a dockboard incorporating the lip lifting mechanism of the invention with the ramp in the horizontal cross traffic position;

FIG. 2 is a view similar to FIG. 1, showing the ramp in the elevated position and the lip in the pendant position;

FIG. 3 is a view similar to FIG. 1 showing the ramp as walked down and the lip being in the extended position;

FIG. 4 is a view similar to FIG. 1 showing the lip lifting mechanism in the over-center position;

FIG. 5 is a view similar to FIG. 1, showing the lip in the fully extended position and engaged with a truck bed and the lip lifting mechanism in the under center position;

FIG. 6 is a front elevation of the dockboard shown in FIG. 1 with parts broken away in section;

FIG. 7 is an enlarged fragmentary side elevation of the toggle structure; and

FIG. 8 is a section taken along line 8—8 of FIG. 7.

DESCRIPTION OF THE PREFERRED EMBODIMENT

The drawings illustrate a dockboard which is adapted to be mounted in a pit or depression in a loading dock. The dockboard 1 includes a frame 2 or supporting structure and a ramp 3 is hinged at its rear edge to the frame. The ramp is adapted to be biased upwardly to an inclined position by a spring assembly 4, such as that disclosed in U.S. Pat. No. 3,528,118. The spring assembly 4 includes a spring 5 that is connected to a lever arm 6 which is secured to the rear edge of the ramp and the force of the spring acts to move the lever arm 6 forwardly to thereby urge the ramp 3 to an upwardly inclined position, as shown in FIG. 3.

The ramp 3 can be held in any desired position by means of a holddown mechanism 7, as disclosed in the U.S. Pat. No. 3,646,627. The holddown mechanism 7 is a uni-directional device which prevents the upward movement of the ramp, unless released, while permitting free downward movement of the ramp.

An extension lip 8 is pivoted to the forward edge of the ramp. The lip 8 and ramp 3 carry aligned hinge tubes 9 which receive a hinge pin 10. With this construction the lip can be pivoted from a downwardly hanging pendant position, as shown in FIG. 1, to an extended position in which the lip forms an extension to the upper surface of the ramp, as shown in FIG. 6. Engagement of the rear edge of the lip with the forward surface of the ramp prevents the lip from moving beyond the extended position in which it is generally flush with the ramp.

In accordance with the invention, the lip 8 is moved from the pendant position to the extended position by a lip lifting mechanism which operates in consequence of the ramp being walked down from the upwardly inclined position toward the horizontal or cross traffic position. The lip lifting mechanism includes a lip lifting lug 11 which is pivoted to the hinge pin 10 and extends rearwardly through an opening in the header 12 of of ramp 3. The forward surface 13 of lug 11 is adapted to engage the underside of the lip, and as the lug is pivoted forwardly, the lip will be pivoted toward its extended position.

Lug 11 is pivoted to the forward end of a rod 14 by pin 15, and the rear end of the rod 14 carries a clevis 16 which is pivotally connected to a pair of links 17 through a pin 18. A roller 19 is located between the links 17 and is journalled on the pin 18.

The opposite ends of the links 17 are pivoted by a pivot pin 20 to the lower ends of brackets 21 which are fixed to the ramp and extend downwardly from the deck plate of the ramp. The links 17 and rod 14 constitute a toggle mechanism.

In addition, a latch pin 22 is secured within aligned openings in the links 17 and is located between the pins 18 and 20.

When the ramp is in the generally horizontal or cross traffic position, as shown in FIG. 1, the links 17 and rod 14 are in an undercenter position in which the links 17 are disposed generally vertically and the rod 14 is generally horizontal. As the ramp 3 is moved upwardly through operation of the spring assembly 4 to the inclined position, the links 17 will be latched to the supporting frame 2 through operation of a latch bar 23. With the links latched to the frame 2, downward movement of the ramp toward the horizontal position will cause the links to pivot forwardly, thereby moving rod 14 forwardly and lifting the lip 8. The rear end of the latch bar 23 is pivotally connected to a pair of lugs 24 which are mounted on the supporting structure or frame 2 of the dockboard, while the forward portion of the bar 23 extends between the links 17 and rides on the latch pin 22. As best illustrated in FIG. 7, the lower surface 25 of the bar 23 has a notch 26 defined by an abrupt shoulder 27 and surface 28. Engagement of the notch 26 with the latch pin 22 will interconnect the frame 2 and the links 17, causing the links 17 to pivot forwardly about the pin 20 as the ramp 3 is moved downwardly relative to the bar 23, as will be described in greater detail hereinafter.

As the ramp 3 is pivoted upwardly with respect to the bar 23, the latch pin 22 will ride on the bottom surface of the bar 23 and fall into the notch 26 when the ramp approaches its maximum elevation. Extending laterally from the sides of the bar 23 is a pin 29 and the forward edges 30 of the brackets 21 will engage the ends of the stop pin 29 to limit the upward movement of the ramp with respect to the supporting structure or frame.

The dockboard is stored with the ramp in the horizontal or cross traffic position. When it is desired to operate the dockboard, the operator will release the holddown mechanism 7 by pulling upwardly on a ring 31 which is located within a well 32 in the ramp. Ring 31 is connected by cable 33 to the lever 34 of the holddown mechanism 7 and cable 33 passes over a pulley 35, which is mounted on the bar 23, and over a second pulley 36 which is mounted on the undersurface of the ramp. By pulling upwardly on the ring 31 the lever of the holddown mechanism will be pivoted to thereby release the holddown mechanism and enable the spring assembly 4 to pivot the ramp toward the upward inclined position.

As the ramp pivots upwardly, the latch pin 22 will ride along the lower surface of the bar 23 and will move into engagement with the notch 26 as the ramp approaches its maximum elevation. Engagement of the surface 30 with the stop pin 29 will limit the upward movement of the ramp. With the ramp in the upwardly inclined position, as shown in FIG. 3, the lip 8 is still in the pendant position.

The operator then releases the cable 33 to the holddown mechanism 7 and walks outwardly on the ramp. The weight of the operator in combination with the weight of the ramp will overcome the force of the spring assembly 4, causing the ramp to pivot downwardly toward the horizontal position. As the latch bar 23 is connected to the links 17 through engagement of the latch pin 22 with notch 26, the downward movement of the ramp relative to the bar 23 will cause the links 17 to pivot forwardly in a counterclockwise direction, as shown in the drawings, thereby moving the rod 14 forwardly to pivot the lug 10 forwardly and move the lip toward the extended position. As the ramp continues to be walked down, the links 17 and rod 14 will be moved into an in-line or on-center position, as shown in FIG. 3 and in this position of the toggle mechanism, the lip is at an extended position just short of its fully extended position.

Continued downward movement of the ramp, will move the links 17 and rod 14 beyond the on-center position, as shown in FIG. 4, to an over-center position. When the toggle moves to over-center, the weight of the lip 8 acting rearwardly through the rod 14 will tend to pivot the links 17 counterclockwise to a more over-center position and engagement of the ends of the latch pin 22 with the surfaces 30 of the brackets 21 serves as a stop to limit the counterclockwise pivotal movement of the links 17. As the links and the rod move into the over-center position, the roller 19 will engage the undersurface of the latch bar 23, to lift the bar and move the notch 26 out of engagement with the latch pin 22. Even though the latch pin 22 is released from engagement with notch 26, the weight of the lip acting through rod 14 will maintain the toggle in the over-center position.

As the ramp is walked down further, the lip 8 will move into engagement with the truck bed 37, as shown in FIG. 5, to pivot the lip to its fully extended position where it is substantially flush with the deck plate of the ramp. In practice, the lip when fully extended, and the rear edge of the lip engaged with the ramp, will be perhaps 7° from being planar with the upper surface of the ramp. When the lip engages the bed of the truck, the weight of the lip will be removed from the rod 14, with the result that the links 17 will pivot downwardly to move the links and the rod 14 into an undercenter position as shown in FIG. 5, thereby breaking the toggle. When the truck moves away from the dock, the lip 8 will then be free to pivot downwardly to the pendant position.

The pin 29, as previously noted, serves as a stop to limit the upward movement of the ramp. The pin 29 serves a secondary function in that if the ring 31 attached to the holddown cable 33 is pulled upwardly by the operator when the lifting mechanism is in the position shown in FIG. 4, with the lip partially extended, the upward movement of the ramp will cause the pin 29 to wedge between the edges 30 of brackets 21 and the upper surface of link 17, thereby breaking the toggle, and enabling the links 17 and the rod 14 to move to an undercenter position, with the result that the lip can then fall to its pendant position. This insures that the lip will always be in a pendant position when the ramp is in its elevated position, as shown in FIG. 2.

The dockboard of the invention also has a provision to permit the ramp to be walked down toward the horizontal position without moving the lip to the extended position. To do this, the operator pulls upwardly in the ring 31 and after the holddown lever 34 has been moved to its full release position, in which case the cable 33 is taut, further upward movement on the ring will pivot the bar 23 upwardly due to the fact that the cable is trained over the pulley 35 which is attached to the bar. Upward pivotal movement of the bar will move the notch 26 out of engagement with the latch pin 22. While still maintaining tension on the cable 33 to keep the latch pin 22 out of engagement with the notch 26, the operator can then walk the ramp downwardly until the latch pin is beyond the notch and then the operator can release the pull on the ring 31. Thus, with this procedure it is possible to walk the ramp down to the horizontal cross traffic position without elevating the lip.

The dockboard of the invention utilizes the downward movement of the ramp from the inclined position toward the horizontal cross traffic position to move the lip to the extended position. As the action of elevating the lip is not tied into the upward velocity of the ramp, the ramp counterbalancing spring can be designed to provide a slower and smoother upward movement for the ramp. By providing a slower and smoother ramp movement, positive latching of the lip in the partially extended position is assured.

As the lip does not move to its extended position until the ramp is walked down, the operational capacity of the dockboard is increased for the problem of interference to lip movement by a high truck position is substantially reduced. This is an advantage over dockboards used in the past in which the lip was elevated as a consequence of upward movement of the ramp. With the prior structure, the tip of the lip, as it was being swung upwardly, could engage the bed of a truck which was located above dock level, thereby preventing the latching mechanism from operating and requiring that the operator manually lift the lip to the extended position.

Various modes of carrying out the invention are contemplated as being within the scope of the following claims particularly pointing out and distinctly claiming the subject matter which is regarded as the invention.

I claim:

1. A dockboard, comprising a supporting structure, a ramp hinged at its rear edge to the supporting structure and movable between a generally horizontal cross traffic position and an upwardly inclined position, a lip hinged to the forward edge of the ramp and movable between a downwardly hanging pendant position and an outwardly extending position where the lip forms an extension to the ramp, lip lifting means operably connected to the lip and including a first toggle member pivotally connected to the ramp and a second toggle member pivotally connected to the first toggle member, said toggle members being movable from a first unlocked position, wherein said toggle members are disposed at an acute angle with respect to each other, to a second locked position, said second toggle member being operably connected to the lip and disposed to exert to force against the underside of the lip as the toggle members are moved from the unlocked to the locked position to thereby move said lip to a partially extended position short of its fully extended position, and operating means releasibly engageable with the lip lifting means and responsive to downward movement of the ramp from the upwardly inclined position toward the horizontal cross traffic position for actuating said lip lifting means and moving the toggle members from the unlocked to the locked position to thereby move the lip from the pendant position to the partially extended position, initial upward movement of the ramp from the cross traffic position toward said inclined position acting to operably engage said operating means with said lip lifting means and subsequent downward movement of the ramp causing said operating means to operate said lip lifting means to move the lip toward the partially extended position, movement of the lip to the fully extended position as the lip engages the bed of a carrier located in front of the dock acting to remove the weight of the lip from the second toggle member and permit the toggle members to move from the locked position to the unlocked position to thereby permit the lip to return freely to the pendant position when the carrier moves away from the dock.

2. The dockboard of claim 1, wherein said operating means comprises an operating member pivotally connected to the supporting structure.

3. The dockboard of claim 2, and including a first connecting member associated with said first toggle member and a second connecting member associated with said operating member, said connecting members disposed to be engaged on upward movement of the ramp to operably connect the operating member and said lip lifting means.

4. The dockboard of claim 3, and including biasing means for biasing the connecting members into engagement.

5. The dockboard of claim 3, wherein said first connecting member comprises a pin on said first toggle member and said second connecting member comprises a notch on said operating member to receive said pin.

6. The dockboard of claim 1, wherein said lift lifting means also includes a lip engaging member mounted for pivotal movement with respect to the ramp and pivotally connected to said second toggle member, said lip engaging member disposed to engage the underside of the lip, moving the toggle members to the locked position acting to force the lip engaging member against the lip to pivot the lip from the pendant position to the partially extended position.

7. The dockboard of claim 6, wherein said lip engaging member has a surface disposed to engage the underside of the lip, said surface arranged to move out of engagement with the extended lip when the toggle members are moved from the locked to the unlocked position so that the lip can freely return to the pendant position when the carrier moves away from the dock.

8. The dockboard of claim 6, and including hinge means for hinging the lip to the ramp, said lip engaging member mounted for pivotal movement on said hinge means.

9. A dockboard, comprising a supporting structure, a ramp hinged at its rear edge to the supporting structure and movable between a generally horizontal cross traffic position and an upwardly inclined position, a lip hinged to the forward edge of the ramp and movable between a downwardly hanging pendant position and an outwardly extending position where the lip forms an extension to the ramp, lip lifting means operably connected to the lip and including a link member pivotally connected to the ramp and an elongated member pivotally connected to the link member, said elongated member being operably connected to the lip, said link member and elongated member mounted for movement between a first undercenter position wherein said members are disposed at an acute angle with respect to each other, through an on-center position wherein said members are disposed in alignment, to an over-center position wherein said members are disposed at an angle with respect to each other, and a rigid operating member disposed to operably connect the supporting structure with the lip lifting means and responsive to downward movement of the ramp from the upwardly inclined position toward the cross traffic position for actuating said lip lifting means and moving the members from the undercenter position through said on-center position to said over-center position to thereby move the lip from the pendant position to a partially extended position short of a fully extended position, movement of the lip to the fully extended position as the lip engages a carrier located in front of the dock on further downward movement of the ramp acting to remove the weight of the lip from the elongated member and effecting movement of said members from the over-center position to the undercenter position to thereby permit the lip to return freely to the pendant position when the carrier moves away from the dock.

10. The dockboard of claim 9, and including means responsive to upward movement of the ramp from the cross traffic position toward said inclined position for actuating said operating member and operably connecting said lip lifting means to said supporting structure whereby subsequent downward movement of the ramp will cause said operating member to actuate said lip lifting means to move the lip, and means responsive to said members moving to the over-center position for disengaging said operating member from said lip lifting means.

11. The dockboard of claim 9, and including stop means connected to the ramp for limiting the movement of said members in said over-center position.

* * * * *

UNITED STATES PATENT AND TRADEMARK OFFICE
CERTIFICATE OF CORRECTION

PATENT NO. : 3,997,932
DATED : December 21, 1976
INVENTOR(S) : THOMAS ARTZBERGER It is certified that error appears in the above-identified patent and that said Letters Patent are hereby corrected as shown below:

Column 3, line 41, Cancel "of", second occurrence,

Column 7, Line 9, Claim 6, Cancel "lift" and substitute therefor ---lip---

Signed and Sealed this

Twelfth Day of April 1977

[SEAL]

Attest:

RUTH C. MASON
*Attesting Officer*

C. MARSHALL DANN
*Commissioner of Patents and Trademarks*